Oct. 28, 1969  J. RESAG ET AL  3,474,487
HINGE FITTING FOR A SEAT AND BACK REST
Filed Oct. 15, 1965  6 Sheets-Sheet 6

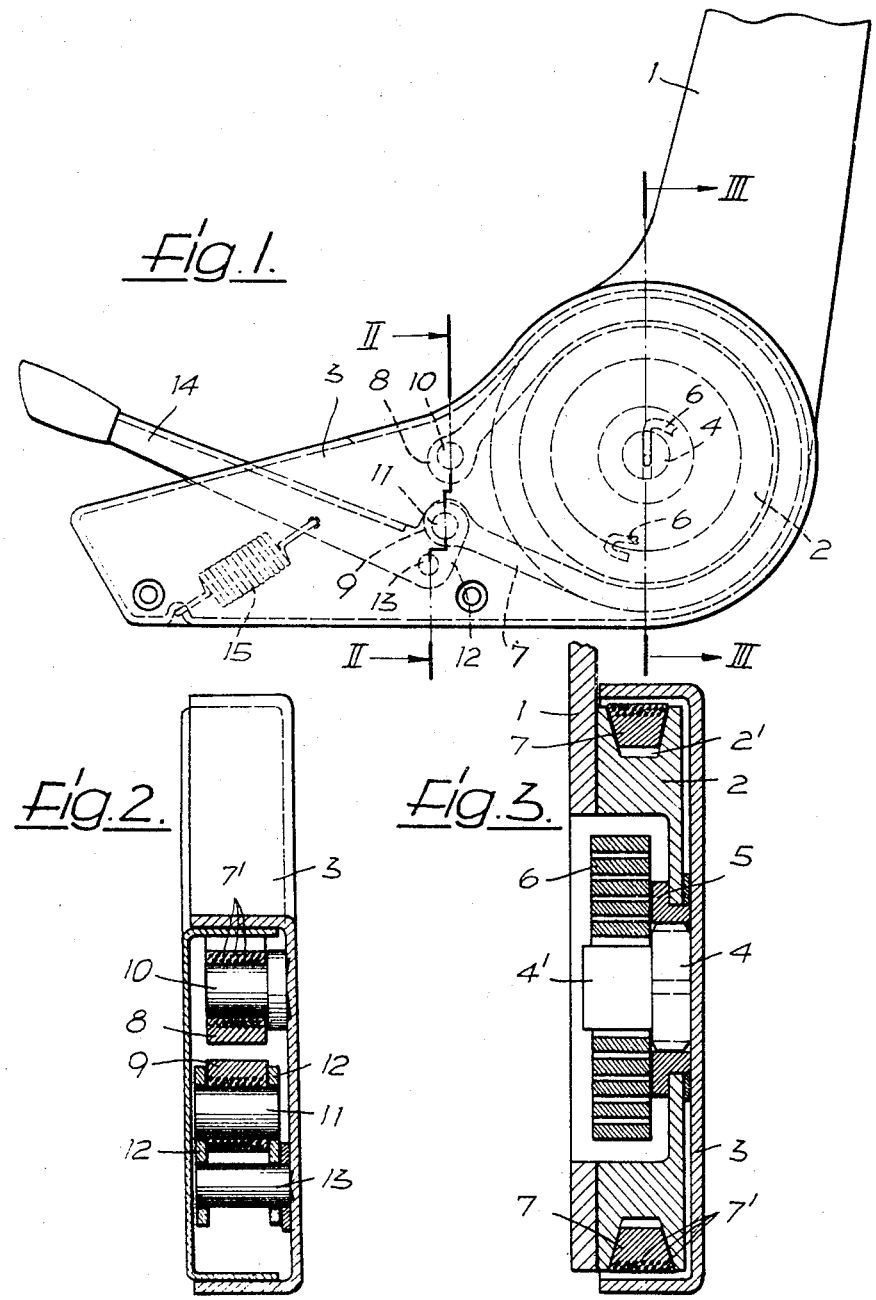

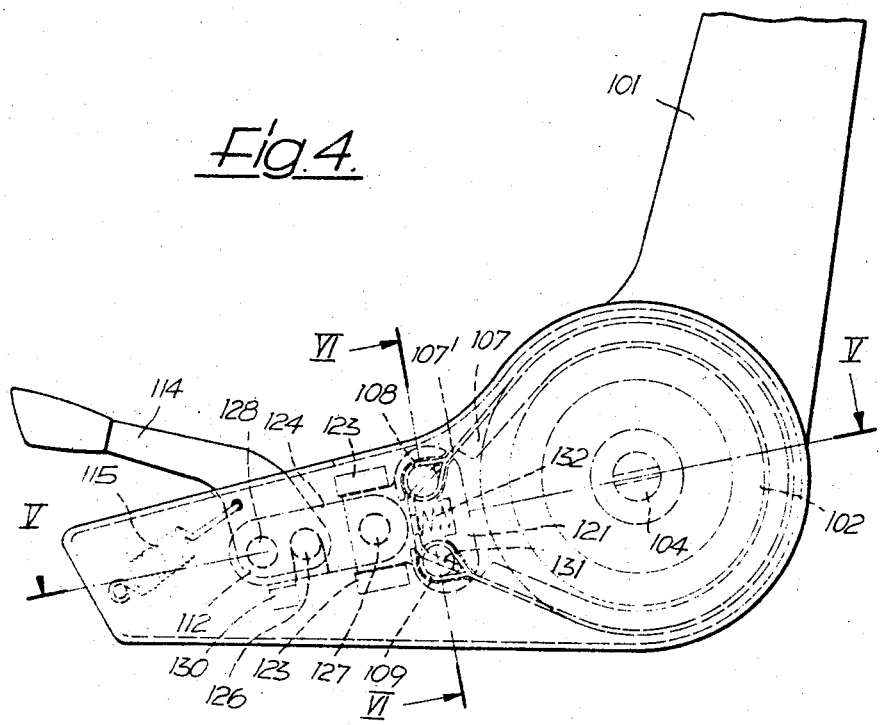
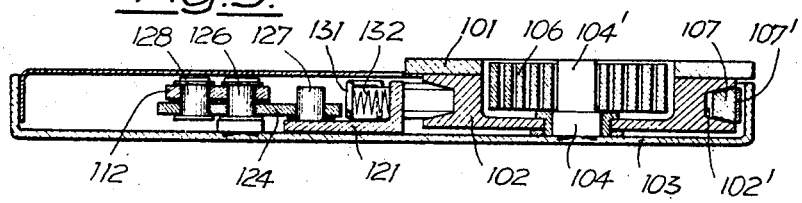
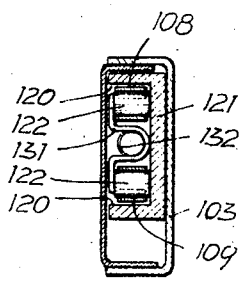

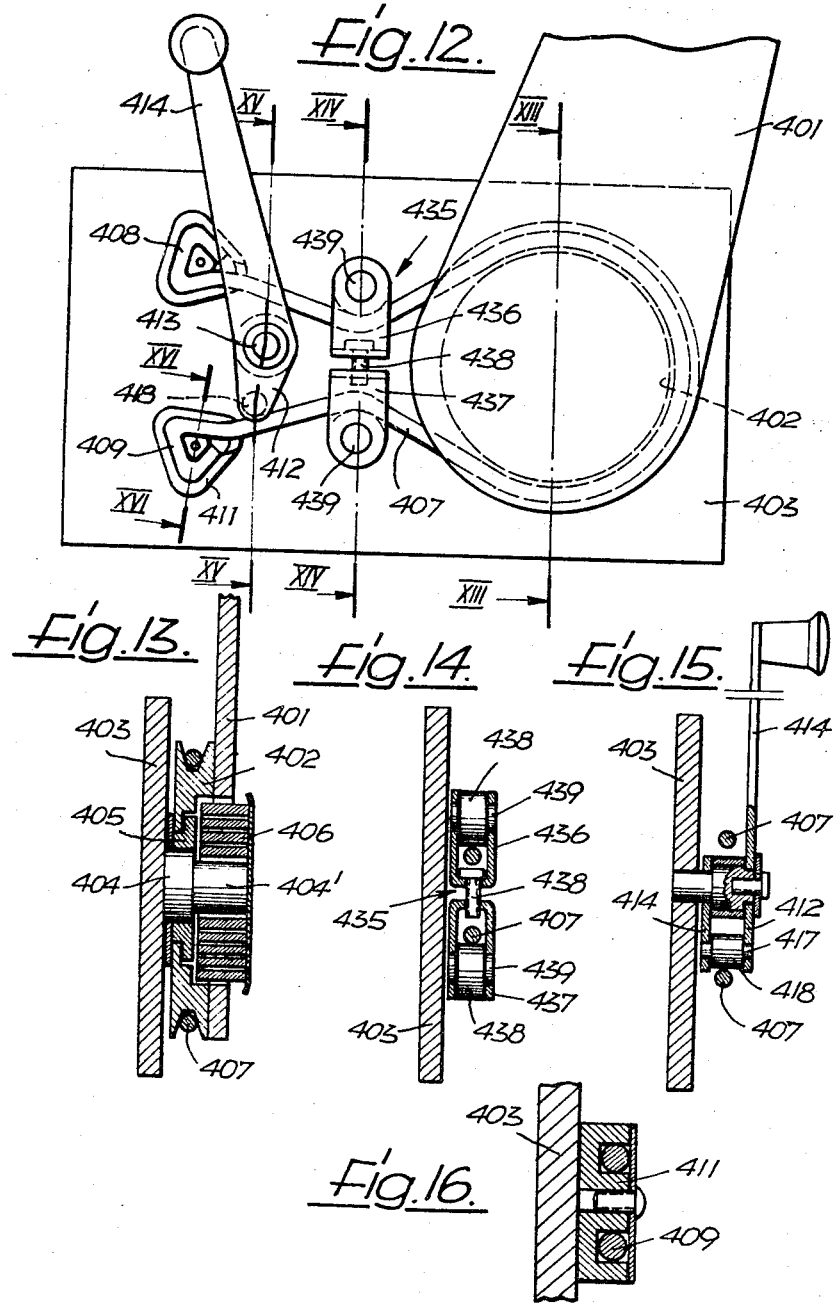

INVENTORS
Jörg Resag and
Wolfgang Fussnegger
BY Ernest G. Montague
ATTORNEY

United States Patent Office 3,474,487
Patented Oct. 28, 1969

3,474,487
HINGE FITTING FOR A SEAT AND BACK REST
Jörg Resag, Stuttgart-Degerloch, and Wolfgang Fussnegger, Leonberg-Eltingen, Germany, assignors to Recaro AG., Glarus, Switzerland, a corporation of Switzerland
Filed Oct. 15, 1965, Ser. No. 496,499
Claims priority, application Germany, Oct. 16, 1964, R 39,022
Int. Cl. E05d *11/08, 11/10;* F16d *51/00*
U.S. Cl. 16—140                                    18 Claims

ABSTRACT OF THE DISCLOSURE

A hinge fitting for a seat having an infinitely adjustable back rest thereon, comprising a first hinge adapted to be secured to one side of the back rest, a second hinge member adapted to be secured to one side of the seat, pivot means connecting the two hinge members so as to be pivotable about a common axis relative to each other, and locking means for locking the first hinge member in a fixed position at any desired angle to the second hinge member. The locking means comprises two locking elements operatively associated with each other and connected to the first and second hinge members, respectively, the first of the locking elements comprising a substantially cylindrical member having a central axis coaxial with the common axis of the hinge members and having a groove of a substantially V-shaped cross section in its peripheral surface, the second of the locking elements comprising a flexible belt-like member looped around at least a part of the peripheral surface of the cylindrical member and engaging into the groove.

---

The present invention relates to a pair of hinge fittings which is adapted to be secured to the opposite sides of a seat and back rest, especially of an automobile or other motor vehicle, for pivotably connecting these parts to each other, and wherein at least one of these hinge fittings which is to be secured to one side of the seat and back rest comprises a pair of hinge members which are pivotably connected and infinitely adjustable to different angles relative to each other and are adapted to be locked in a fixed position at any desired angle to each other by means of a locking device which may be operaaed by a control member which is provided on one of the two hinge members.

Prior to this invention there have been numerous hinge fittings of the type as described above which were provided with locking means of different construc.ions which, however, were always rather complicated and expensive and usually difficult to manipulate.

It is an object of the present invention to provide an infinitely adjustable hinge fitting of the above-mentioned type which may be produced very easily and at a low expense, the two hinge members of which may be easily and quickly adjusted to any desired angle relative to each other, and the locking means of which are adapted to lock the two hinge members by a frictional connection very securely against any pivoting movement relative to each other.

This object is attained according to the invention by providing a hinge fitting which consists of two hinge members which are pivotably secured to each other and each of which is provided with one of two operatively associated locking elements which in their locking position are in frictional engagement with each other and one of which consists of a cylindrical element which is rigidly secured to one of these hinge members in a position coaxial to the pivot axis of the two hinge members.

One essential feature of the invention consists in providing the cylindrical locking element with a substantially V-shaped groove in its peripheral surface, and in providing the second locking element in the form of a flexible belt-like member which is looped around at least a part of the periphery of the first locking element and engages into its V-shaped groove, and one or both free ends of which may be tightened so as to clamp this belt or the like under tension upon the surfaces of the V-shaped groove.

These two locking elements may consist of a circular grooved disk or pulley similar to a V-belt pulley and of a belt or similar flexible element which preferably has a substantially V-shaped cross section similar to that of a V-belt. When this belt is in its tightened locking position and an attempt is made to pivot the back rest to which one of the hinge members is secured in one direction relative to the seat to which the other hinge member is secured and thus to pivot the two hinge members relative to each other, the tension in one part of the belt will be even further increased and cause an increased pressure of the belt upon the surfaces of the V-shaped groove in the disk or pulley and thus an increased locking action between the two locking elements. Due to this additional locking action, the cylindrical grooved locking element, i.e., the V-belt pulled, is only required to have a relatively small diameter, and the looping angle of the belt-like locking element around this pulley may be less than 360°. This permits the locking device and thus also the entire hinge fitting to be made of relatively small dimensions and of structurally very simple means, and it also permits this locking device to be actuated as well as manually released by the application of very small amounts of energy.

According to one preferred embodiment of the invention the first locking element in the form of a V-belt pulley is disposed coaxially to the pivot axis of the hinge fitting and rigidly secured to the hinge member which is to be secured to the back rest, while the ends of the second locking element in the form of a V-belt or the like are secured to the other hinge member which is to be secured to the seat. The locking device further comprises a control member which may be provided in the form of a control lever which either serves as or is connected to a device for tightening the second locking element.

Another feature of the invention provides that this tightening device comprises a member to which at least one end of the second belt-like locking element is secured and which exerts a traction upon the latter when the control lever is pivoted to its locking position.

According to a further feature of the invention it is also possible to secure both ends of the second locking element rigidly to one of the hinge members, for example, the hinge member which is to be secured to the seat, and to provide the tightening device in the form of a control lever which, when pivoted to its locking position, exerts a lateral pressure upon at least one of the two end sections of the second locking element within an area between the rigidly secured end of this section and the nearest point of engagement of this end section with the first locking element, i.e., the pulley which is secured to the other hinge member which, in turn, is to be secured to the back rest. By this lateral pressure which is exerted by the control lever upon at least one end section of the belt-like locking element, this end section is bent at an angle and is thereby tightened. The locking tension which may thus be produced in the belt-like element then depends upon the size of the angle which may be produced in the respective end section of this element by the pivoting movemenet of the control lever. A hinge fitting in accordance with this embodiment of the invention has the advantage of being of a very simple and inexpensive construction.

Another feature of the invention consists in providing the control lever of such a shape and in pivotably mounting it in such a position that, when it is in its locking position which is determined by a fixed stop member, it is pivoted to a point beyond its dead-center position. The tension of the belt-like locking element then automatically prevents the locking lever from pivoting to its releasing position, unless this lever is manually operated to move it over this dead-center position. This feature of automatically arresting the locking lever in its locking position is of particular importance since it is then only necessary to provide a return spring which tends to hold this lever in this position, while any additional means for positively securing it in its locking position may be omitted.

Aside from the mentioned control lever, it is another feature of the invention to provide an additional tightening element which engages upon the outer sides of both free end sections of the belt-like locking element at a point between their firmly secured ends and their nearest points of engagement with the pulley-like locking element and which thereby bends both end sections at these points toward each other so that both free end sections then extend in angular directions. This additional tightening element will increase the maximum torque which may be taken up by the main locking device since, when an attempt is made to pivot the back rest and thus to pivot the two hinge members relative to each other, the tension in one free end section of the belt will be increased and the angle at which this end section extends will thereby be straightened out or enlarged, while the pull which is then exerted by the additional tightening element upon the second end section of the belt will bend this end section to a more acute angle and thereby also increase the tension of this second end section.

A supplementary feature of the invention consists in providing this additional tightening element in the form of a yoke which embraces both free end portion of the belt-like element and is adjustable so as to permit these end sections to be clamped at different distances from each other. This adjustability permits inaccuracies of manufacture of the clamping device as well as an extension of the belt-like element due to wear to be easily compensated.

The belt-like locking element may consist of a conventional V-belt which is preferably provided with a textile or wire insert. In order to maintain the V-belt at constant length and to permit a very high traction to be applied thereon, it is of considerable advantage to provide either only the upper side or both the upper and lower sides of the belt with a flexible steel band. The belt-like locking element may, however, also consist entirely of a flexible steel band of a cross-sectional shape in accordance with that of the substantially V-shaped groove in the pulley-like locking element. For increasing the friction of such a steel band on the pulley-like locking element, it is advisable to provide the inclined lateral sides thereof with a friction coating. Instead of employing a belt-like locking element of a substantially V-shaped cross-section, it is also possible to make such an element of a circular cross-section of a sufficient thickness. In some cases it is even possible to attain the required locking effect by employing a flexible wire of a circular cross-section and a sufficient thickness.

The above mentioned as well as numerous other features and advantages of the present invention will become more clearly apparently from the following detailed description thereof which is to be read with reference to the accompanying drawings, in which:

FIGURE 1 shows a side view of a hinge fitting according to one embodiment of the invention;

FIGURE 2 shows a cross section which is taken along the line II—II of FIGURE 1;

FIGURE 3 shows a cross section which is taken along the line III—III of FIGURE 1;

FIGURE 4 shows a side view of a hinge fitting according to a modification of the invention, forming a second embodiment thereof;

FIGURE 5 shows a cross section which is taken along the line of V—V of FIGURE 4;

FIGURE 6 shows a cross section which is taken along the line VI—VI of FIGURE 4;

FIGURE 12 shows a side view of a hinge fitting according to another modification of the invention; forming a fifth embodiment thereof;

FIGURE 13 shows a cross section which is taken along the line XIII—XIII of FIGURE 12;

FIGURE 14 shows a cross section which is taken along the line XIV—XIV of FIGURE 12;

FIGURE 15 shows a cross section which is taken along the line XV—XV of FIGURE 12;

FIGURE 16 shows a cross section which is taken along the line XVI—XVI of FIGURE 12;

FIGURE 19 shows a side view of another modification of the belt-like locking element; while

Figure 7:
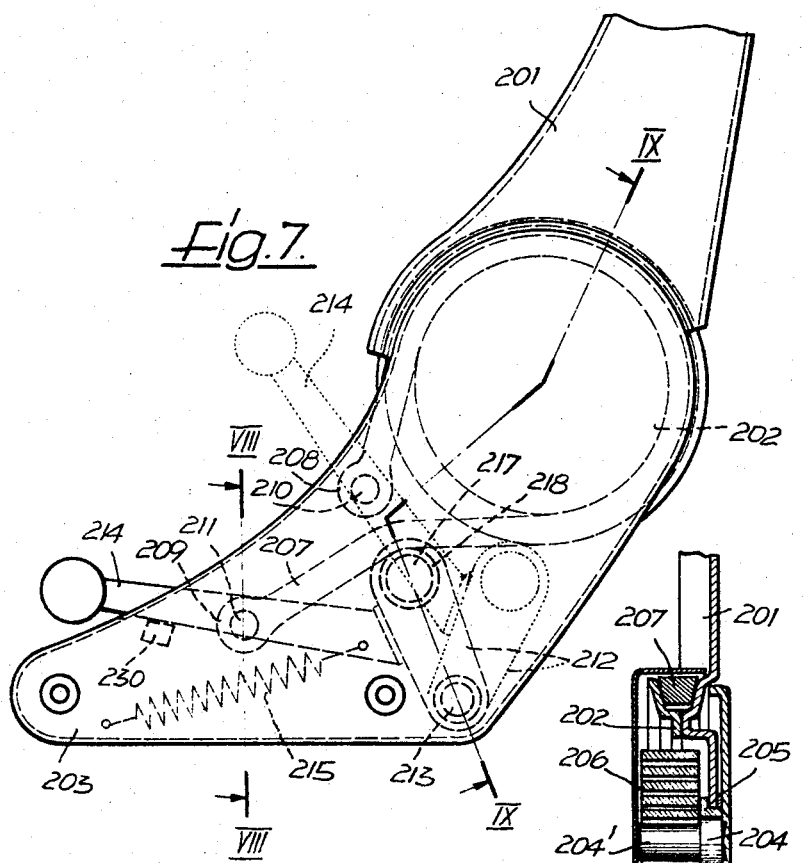
FIGURE 7 shows a side view of a hinge fitting according to another modification of the invention, forming a third embodiment thereof.

In order to distinguish the five different embodiments of the invention as illustrated in the drawings more clearly from each other, all those parts of each embodiment which are substantially similar to those in the other embodiments are designated by reference numerals which are raised by 100 over the numerals which designate these parts in the preceding embodiment.

Referring first to FIGURES 1 to 3 of the drawings, the hinge fitting according to the invention which is primarily intended for pivotably connecting a seat and back rest (not shown) of an automobile or other vehicle, and one of which is to be secured to each side of such a seat and back rest, comprises an upper hinge member 1, as shown particularly in FIGURE 3, which is to be secured to the back rest and to which a circular disk or pulley 2 is rigidly secured which is provided with a V-shaped groove 2' is peripheral surface and forms one of two associated locking elements for preventing the upper hinge member 1 from being unintentionally pivoted relative to the lower hinge member 3 which is to be secured to the seat. For pivotably connecting the two hinge members 1 and 3 to each other, the lower hinge member 3 is provided with an axle 4 on which a collar nut 5 is screwed on which the pulley 2 is mounted so as to be freely rotatable but unmovable in the axial direction. A spiral return spring 6 which is mounted on an extension 4' of the axle 4 and tends to pivot the upper hinge member 1 forwardly has one end rigidly secured to the extension 4', while its other end is connected to the upper hinge member 1 or to the pulley 2.

As further illustrated in FIGURES 1 and 3, a V-belt 7 which serves as the second locking element engages into the V-shaped groove 2' of pulley 2 and describes a looping angle of less than 360°. This belt 7 is provided with a wire reinforcement 7' which extends in the longitudinal direction and the two ends of the belt 7 form eyes 8 and 9. The upper eye 8 is hooked over a pin 10 which is secured to the lower hinge member 3, while the lower eye 9 is hooked over a pin 11 which is mounted on an arm 12 of a control lever 14 which is pivotably mounted on a pivot pin 13 which is secured to the lower hinge member 3. The length of the V-belt 7, the position of pivot pin 13 and the angle between the arm 12 and the control lever 14 are coordinated in such a manner that, arm 12 will exert approximately its greatest leverage when the control lever 14 is in its locking position.

Unless the control lever 14 is pulled upwardly by hand, a traction is at all times applied upon the V-belt 7 by the action of a tension spring 15, one end of which is connected to the control lever 14 and the other end to the lower hinge member 3. This traction is so strong that the V-belt 7 is pressed into the V-groove 2 under such a tension that, if a torque is exerted upon the upper member 1 which tends to pivot this hinge member rearwardly, such a rearward movement will be prevented. For carrying out such a rearward movement of the hinge member 1, it is therefore necessary to pull the control lever 14 upwardly so that the tension of the V-belt 7 will be eliminated or at least reduced to such an extent that no further locking action is exerted upon hinge member 1.

The tension which is normally exerted by the tension spring 15 upon the V-belt 7 is sufficient to prevent the upper hinge member 1 from pivoting forwardly as the result of the torque which is exerted by the return spring 6. If, however, this torque is increased, for example, when an effort is made to pivot the back rest forwardly, it will exceed the gripping effect of the locking device. The back rest may therefore then be pivoted forwardly without requiring the control lever 14 to be actuated.

The embodiment of the invention as illustrated in FIGURES 4 to 6 differs from the embodiment according to FIGURES 1 to 3 only by the particular design and construction of the means for tightening the V-belt. The construction and arrangement of the other parts therefore do not need to be further described.

The V-belt 107 which consists of a flexible steel band 107' and of a friction belt of a trapezoidal cross section which is either molded or glued upon the steel band 107' is provided on its two ends with eyes 108 and 109 which are inserted through slots into a recess 120 in a slide member 121, as shown particularly in FIGURE 6, which is disposed symmetrically to these eyes. In order to prevent the eyes 108 and 109 from being deformed when a considerable tension is applied upon the steel band 107' a filler 122 is inserted into each eye.

Slide member 121 is guided between a pair of guides 123 so as to be movable in a straight direction radially to the V-belt pulley 102. This direction of movement coincides with the axis of symmetry of slide member 121.

Slide member 121 has rigidly secured to its rear end a pivot pin 127 on which a flat strap 124 is pivotably mounted which, in turn, is pivotably connected by a pivot pin 128 to one end 112 of a control lever 114. This control lever is pivotably connected to the lower hinge member 103 by a pivot pin 126 which is located on the line of symmetry of slide member 121 between the two pivot pins 127 and 128. The return spring 115 of the control lever 114 is adapted to pivot the later beyond its dead-center position until it engages upon a stop member 130 which is mounted on the lower hinge member 103.

In order to compensate for inaccuracies in manufacture, the two eyes 108 and 109 of the V-belt are inserted with a certain amount of clearance into the recess 120 and are connected to each other by a bridge 131 which is supported on the slide member 121 by a hard compression spring 132 which is mounted centrally within the recess 120.

Since an equal traction is exerted by the slide member 121 upon both eyes 108 and 109 of the V-belt 107 and the control lever 114 cannot be pivoted out of its locking position by a traction which is exerted upon the slide member 121, this hinge fitting will in its locked position prevent any pivoting movement of the hinge member 101 and the back rest thereon in either direction.

Figure 8:
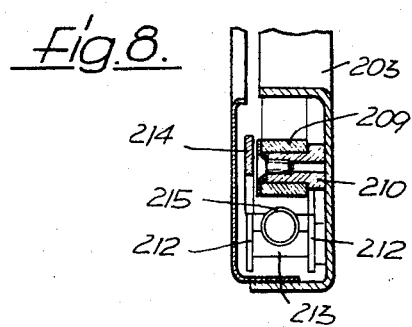
FIGURE 8 shows a cross section which is taken along the line VIII—VIII of FIGURE 7.
Figure 9:
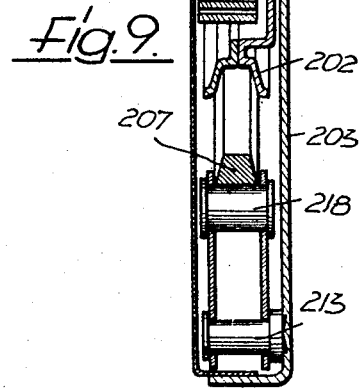
FIGURE 9 shows a cross section which is taken along the line IX—IX of FIGURE 7.

The third embodiment of the invention as illustrated in FIGURES 7 to 9 also differs from the two preceeding embodiments essentially only by the tightening means for the V-belt. The pivotal connection between the upper hinge member 201 and the lower hinge member 203 is of the same construction as previously described. As shown in FIGURE 9 the V-belt pulley 202 is composed of two parts which are welded or brazed together and one of which forms an integral part of the upper hinge member 101. By means of a collar nut 205, pulley 202 is rotatably mounted on the axle 204 which is rigidly secured to the lower hinge member 203. The return spring 206 is also similar to the return spring as employed in the first two embodiments of the invention.

As illustrated in FIGURE 7, the eye-shaped ends 208 and 209 of the V-belt 207 which is looped around the greater part of the periphery of the V-belt pulley 202 are secured to the lower hinge member 203 by pins 210 and 211 which are offset relative to each other so that the V-belt 207 has one short and one long free end section. It is, however, also possible to make both free end sections of a greater length.

Approximately underneath the center of the length of the free end section of the V-belt 207 which is secured to the pin 211, a tightening arm 212 which is rigidly secured to a control lever 214 is pivotably mounted by means of a pin 213 on the lower hinge member 203. Near its free end which is spaced from pin 213, the tightening arm 212 carries a pin 217 on which a bushing 218 is rotatably mounted which is adapted to be applied against the outer side of the longer free end section of the V-belt 207. Pin 217 is spaced at such a distance from pin 213 that when the control lever 214 is in its locking position, as shown in FIGURE 7 in full and dash lines, bushing 218 presses the free end section of the V-belt 207 upwardly and thereby tightens the belt to such an extent that it is firmly clamped against the pulley 202 and thereby prevents the hinge member 201 from pivoting relative to the hinge member 203.

When the control lever 214 is in its locking position, the tightening arm 212 is pivoted beyond its dead-center position and the control lever 214 engages upon a stop member 230. The tightening arm 212 therefore cannot be pivoted out of this position by the force which might be exerted thereon by the V-belt 207 when an attempt is made to pivot the upper hinge member 201 in either direction. Such an attempt will result in an increase in the tension in the V-belt 207 and thereby prevent any unintentional pivoting movement of the upper hinge member 201 and of the back rest to which it is secured.

In order to permit the upper hinge member 214 to be pivoted in either direction it is necessary to pull the control lever 214 upwardly against the action of the return spring 215 to its releasing position, as indicated in FIGURE 7 in dotted lines, in which the bushing 218 on the end of the tightening arm 212 no longer presses against the V-belt 207 and the tension of the latter is thus released.

Figure 10:
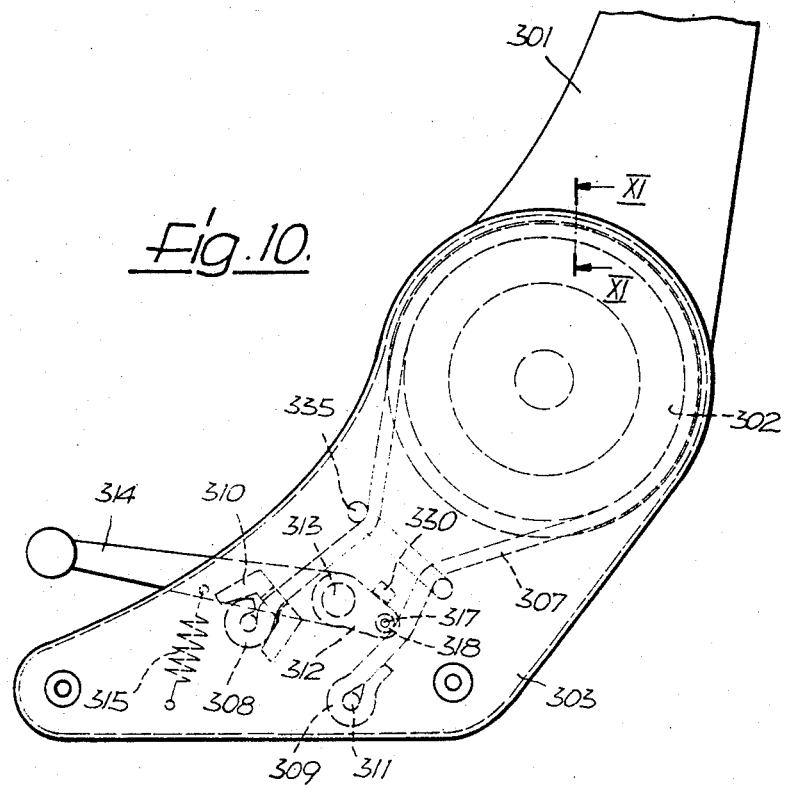
FIGURE 10 shows a side view of a hinge fitting according to another modification of the invention, and forming a fourth embodiment thereof.
Figure 11:
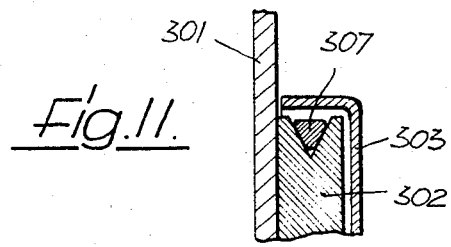
FIGURE 11 shows a cross section which is taken along the line XI—XI of FIGURE 10.
Figure 17:
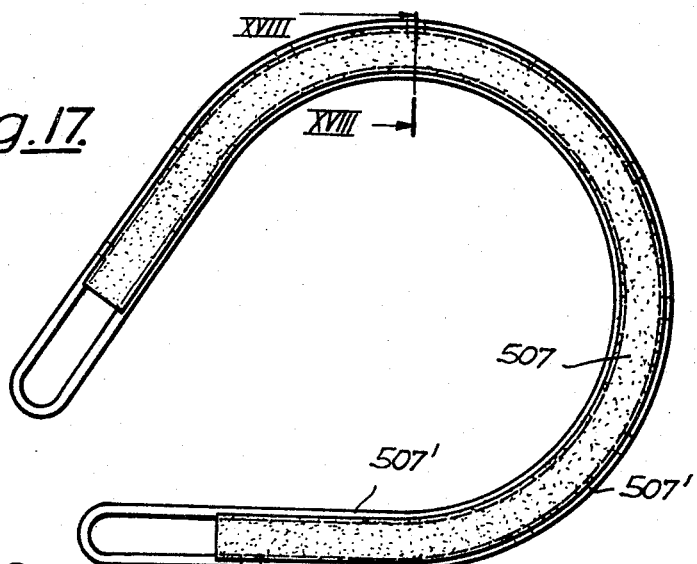
FIGURE 17 shows a side view of a modification of the belt-like locking element.

In the further embodiment of the invention, as illustrated in FIGURES 10 and 11, the V-belt 307 is likewise tightened by being bent out of its normal longitudinal direction. As shown in FIGURE 10, the two free end sections of V-belt 307 are made of a substantially equal length and the eye-shaped ends 308 and 309 are secured to the lower hinge member in the same manner as in the embodiment according to FIGURES 7 to 9. However, for adjusting the tension of the belt, only the eye 309 is hooked over a stationary pin 311, while the other eye 308 is secured to a stop member 310 which is adjustable in the longitudinal direction of the belt.

For tightening the V-belt 307, this belt is bent similarly as in the previous embodiment by means of an arm 312 which is secured to the control lever 314. However, the control lever 314 and the arm 312 thereon are in this case made of such a shape and are pivotably mounted in such a position that the bushing 318 which is rotatably mounted on a pin 317 on the end of arm 312 is adapted to engage with and press upon the inner narrower surface of the V-belt 307. The two free end sections of the belt are for this purpose provided with a yoke 335 which embraces these end sections and clamps them together and thereby bends both end portions so that the two sides of each end section extend at an angle to each other. Since yoke 335 is freely slidable along the two end sections of the belt, its position thereon merely depends upon the forces which are exerted upon the belt. This belt 307 is made of such a length that, when the control lever is in its releasing position, yoke 335 will produce practically no tension in the belt.

When the control lever 314 is in its locking position, yoke 335 increases the locking effect of the belt against an attempted pivoting movement of the upper hinge member 301 in one or the other direction. When such an attempt is made, it causes an increase in the tension in one or the other free end section of the belt. The angle at which the two sides of the tightened end section are held by the yoke 335 is thereby reduced. However, since the yoke 335 maintains the two end sections of the belt at all times at the same distance from each other, the angle between the two sides of the other end section will then be increased with the result that the tension of this other end section will likewise be increased. This, in turn, results in an increase in the locking action of the belt upon the pulley 302 on the upper hinge member 301.

The two hinge members 301 and 303 are prevented from being unintentionally unlocked in a similar manner as those previously described by the fact that arm 312 of the control lever 314 when in its locking position is pivoted to a point beyond its dead-center position and held at this point by its engagement with a stop member 330 under the action of the return spring 315 upon the control lever 314. The construction of the hinge members 301 and 303, their pivotal connection, the connection of the V-belt pulley 320 to the upper hinge member 301, and the arrangement and manner of mounting of the spiral return spring 306 are all similar as in the embodiments of the invention which have been previously described and therefore do not need to be described again.

The fifth embodiment of the invention, as illustrated in FIGURES 12 to 16 differs from the fourth embodiment according to FIGURES 10 and 11 essentially only by the fact that the width of yoke 435 is adjustable. As shown in FIGURE 12, this yoke 435 consists of two parts 436 and 437 which may be adjusted by means of a screw 438 to different distances from each other. Inaccuracies of manufacture which might affect the length and tension of the belt may thus be compensated by an adjustment of the yoke 435, even though both ends of the belt 407 are rigidly secured to the lower hinge member 403. In order to reduce the friction between the belt 407 and the yoke 435, the two parts 436 and 437 of this yoke are provided with rollers 438 which are rotatably mounted on pins 439. In all other respects, the hinge fitting according to FIGURES 12 to 16 is substantially similar to that according to FIGURES 10 and 11, except insofar as, instead of employing a V-belt, the "belt" 407 actually consists of a flexible wire of a circular cross section.

Figures 18, 20:
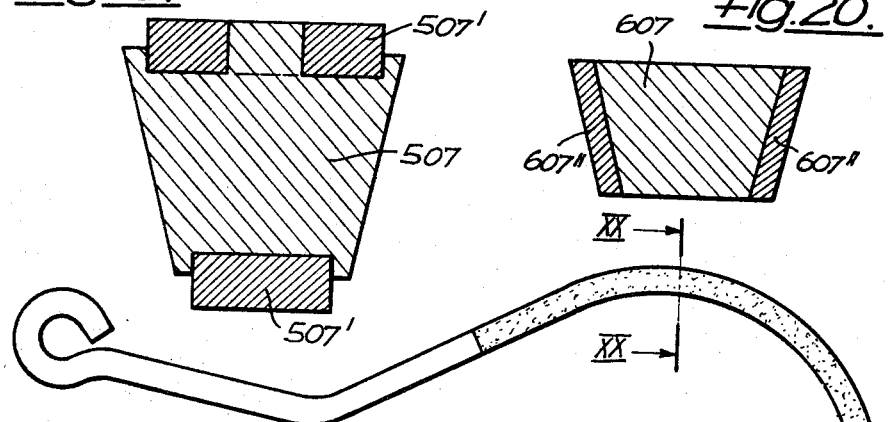
FIGURE 18 shows a cross section which is taken along the line XVIII—XVIII of FIGURE 17.
FIGURE 20 shows a cross section which is taken along the line XX—XX of FIGURE 19.
Figure 19:
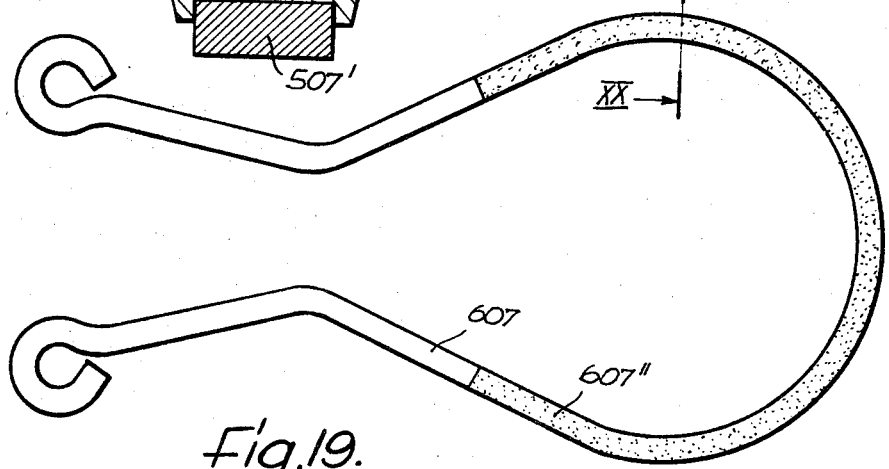

The particular type, shape, and construction of the locking belt or similar element which may be employed in each of the different embodiments of the invention depends primarily upon the locking effect which it has to produce and upon the load which may be exerted upon the surfaces of the V-shaped groove of the pulley. FIGURES 17 to 20 illustrate two further types of V-belts which may be employed in place of the belts as illustrated in the drawings of any of the hinge fittings according to the invention. The V-belt according to FIGURES 17 and 18 has a substantially trapezoidal core 507 which is provided on its outer and inner sides with steel-band layers 507' which are integrally secured to each other at their free outer ends. This V-belt permits an even greater traction to be exerted thereon than the V-belt 107 according to FIGURES 4 to 7 which is provided with a steel-band layer only on one side. The V-belt as illustrated in FIGURES 19 and 20 consists of a flexible steel band 607 of a substantially trapezoidal shape and of a layer 607' of hard rubber or other suitable friction producing material secured to each of the two inclined surfaces of the steel band 607. The steel band 607 may, however, also be employed without these layers 607'.

In order to prevent any distortion of the back rest, the upper hinge member of a hinge fitting according to the invention which is to be secured to one side of the back rest may be rigidly secured in a conventional manner to the upper hinge member of another hinge fitting which is secured to the other side of the back rest, for example, by means of a rod or pipe which extends coaxially to the common pivot axis of both hinge fittings. This other hinge fitting is, however, usually not required to be provided with any locking means.

Although our invention has been illustrated and described with reference to the preferred embodiments thereof, we wish to have it understood that it is in no way limited to the details of such embodiments.

Having thus fully disclosed our invention, what we claim is:

1. A hinge fitting for a seat having an infinitely adjustable back rest thereon, comprising a first hinge member adapted to be secured to one side of the back rest, a second hinge member adapted to be secured to one side of the seat, pivot means connecting said two hinge members so as to be pivotable about a common axis relative to each other, and locking means for locking said first hinge member in a fixed position at any desired angle to said second hinge member, said locking means comprising two locking elements operatively associated with each other and connected to said first and second hinge members, respectively, the first of said locking elements comprising a substantially cylindrical member having a central axis coaxial with said common axis of said hinge members and having a groove of a substantially V-shaped cross section in its peripheral surface, the second of said locking elements comprising a flexible belt-like member looped around at least a part of the peripheral surface of said cylindrical member and engaging into said groove, and control means connected to one of said hinge members for moving said belt-like member from a locking position in which said belt-like member is tightened about said cylindrical member and in tight frictional engagement with the walls of said groove to a releasing position in which said belt-like member is substantially released from said frictional engagement with said cylindrical member and said two hinge members are pivotable relative to each other.

2. A hinge fitting as defined in claim 1, in which said cylindrical member is rigidly secured to said first hinge member, said belt-like member having at least one free end portion projecting from said cylindrical member and connected to said second hinge member, said control means being adapted to act upon said free end portion so as to tighten the same.

3. A hinge fitting as defined in claim 1, in which said cylindrical member is rigidly secured to said first hinge member, said belt-like member having at least one free end portion projecting from said cylindrical member said control means comprising a control lever pivotably mounted on said second hinge member and adapted to be pivoted from said locking position to said releasing position and vice versa and to act by leverage at least upon said one free end portion so as to tighten and release the same.

4. A hinge fitting as defined in claim 3, in which the end of at least said one free end portion of said belt-like member is connected to said control lever so as to be tightened thereby when said lever is pivoted to said locking position.

5. A hinge fitting as defined in claim 3, further comprising a return spring connected to said second hinge member and to said control lever and tending to maintain said control lever in its locking position.

6. A hinge fitting as defined in claim 3, further comprising an intermediate member connected to at least said one free end portion of said belt-like member and to said control lever and adapted to exert a traction upon said free end portion when said control lever is pivoted to said locking position.

7. A hinge fitting as defined in claim 1, in which said belt-like member has a substantially V-shaped cross section and its total length is substantially nonextensible by the action of said control means.

8. A hinge fitting as defined in claim 1, in which said belt-like member comprises a V-belt and a flexible steel band secured to at least one side of said V-belt and extending substantially parallel to the axis of said cylindrical member.

9. A hinge fitting as defined in claim 1, in which said belt-like member comprises a flexible steel band having a substantially V-shaped cross section.

10. A hinge fitting as defined in claim 1, in which said belt-like member comprises a flexible steel band having a substantially V-shaped cross section and a friction coating at least on one side of said steel band adapted to engage with at least one wall of said groove.

11. A hinge fitting for a seat having an infinitely adjustable back rest thereon, comprising a first hinge member adapted to be secured to one side of the back rest, a second hinge member adapted to be secured to one side of the seat, pivot means connecting said two hinge members so as to be pivotable about a common axis relative to each other, and locking means for locking said first hinge member in a fixed position at any desired angle to said second hinge member, said locking means comprising two locking elements operatively associated with each other and connected to said first and second hinge members, respectively, the first of said locking elements comprising a substantially cylindrical member having a central axis coaxial with said common axis of said hinge member and rigidly secured to said first hinge member and having a groove of a substantially V-shaped cross section in its peripheral surface, the second of said locking elements comprising a flexible belt-like member looped around at least a part of the peripheral surface of said cylindrical member and engaging into said groove and having at least one free end section projecting from said cylindrical member, and control means connected to said second hinge member for moving said belt-like member from a locking position in which said belt-like member is tightened about said cylindrical member and in tight frictional engagement with the walls of said groove to a releasing position in which said belt-like member is substantially released from said frictional engagement with said cylindrical member and said two hinge members are pivotable relative to each other, said control means comprising a control lever pivotably mounted on said second hinge member and adapted to be pivoted from said locking position to said releasing position and vice versa and having an arm on one end connected to the end of at least said one free end section and to act by leverage thereon so as to tighten and release the same, and a return spring connected at one end to said second hinge member and at the other end to said control lever and tending to maintain said control lever in its locking position.

12. A hinge fitting for a seat having an infinitely adjustable back rest thereon, comprising a first hinge member adapted to be secured to one side of the back rest, a second hinge member adapted to be secured to one side of the seat, pivot means connecting said two hinge members so as to be pivotable about a common axis relative to each other, and locking means for locking said first hinge member in a fixed position at any desired angle to said second hinge member, said locking means comprising two locking elements operatively associated with each other and connected to said first and second hinge members, respectively, the first of said locking elements comprising a substantially cylindrical member having a central axis coaxial with said common axis of said hinge members and rigidly secured to said first hinge member and having a groove of a substantially V-shaped cross section in its peripheral surface, the second of said locking elements comprising a flexible belt-like member looped around at least a part of the peripheral surface of said cylindrical member and engaging into said groove and having two free end sections projecting from said cylindrical member, and control means connected to said second hinge member for moving said belt-like member from a locking position in which said belt-like member is tightened about said cylindrical member and in a tight frictional engagement with the walls of said groove to a releasing position in which said belt-like member is substantially released from said frictional engagement with said cylindrical member and said two hinge members are pivotable relative to each other, said control means comprising a slide member guided on said second hinge member so as to be movable in a straight direction radially to said cylindrical member, means for securing the ends of said free end sections of said belt-like member to said slide member, a connecting link, a control lever having an arm on one end thereof, said arm having a front end and a rear end, pivot means for pivotably connecting said link at one end thereof to said slide member and at the other end to said rear end of said arm of said control lever, and means for pivotably connecting said front end of said arm to said second hinge member at a point intermediate said two pivot means of said link so as to permit said control lever to be pivoted from a releasing position, in which said slide member is shifted in the direction toward said cylindrical member and exerts substantially no traction upon said end sections of said belt-like member, to a locking position in which said slide member is retracted from said cylindrical member and exerts a traction upon said end sections, and a return spring connected at one end to said second hinge member and at the other end to said control lever and tending to maintain said lever in said locking position.

13. A hinge fitting as defined in claim 12, in which said two ends of said belt-like member are secured to said slide member in a manner so as to have a certain amount of play relative thereto, and further comprising a bridge member connecting said two ends to each other and supporting the same and a spring acting upon said bridge member.

14. A hinge fitting as defined in claim 12, in which said arm is connected to said control lever at such an angle that, when said control lever is moved from its releasing position toward its locking position, said arm is moved beyond its dead-center position.

15. A hinge fitting for a seat having an infinitely adjustable back rest thereon, comprising a first hinge member adapted to be secured to one side of the back rest, a second hinge member adapted to be secured to one side of the seat, pivot means connecting said two hinge mmebers so as to be pivotable about a common axis relative to each other, and locking means for locking said first hinge member in a fixed position at any desired angle to said second hinge member, said locking means comprising two locking elements operatively associated with each other and connected to said first and second hinge members, respectively, the first of said locking elements comprising a substantially cylindrical member having a central axis coaxial with said common axis of said hinge members and having a groove of a substantially V-shaped cross section in its peripheral surface, the second of said locking elements comprising a flexible belt-like member looped around at least a part of the peripheral surface of said cylindrical member and engaging into said groove and having two free end sections projecting from said cylindrical member and secured at their ends to said second hinge member, and control means comprising a lever pivotably mounted on said second hinge member and adapted to be pivoted from a releasing position to a locking position and vice versa, said lever when in said releasing position exerting substantially no force upon said belt-like member so that said belt-like member is substantially released from frictional engagement with said cylindrical member and said hinge members are pivotable relative to each other, said lever when moved to said locking position pressing laterally against and bending and thereby tightening at least one of said end sections within an area intermediate the secured end of said section and its nearest point of engagement with said cylindrical member, whereby said belt-like member is tightened about said cylindrical member and in tight frictional engagement with the walls of said groove and said hinge members are locked in a fixed position to each other.

16. A hinge fitting as defined in claim 15, in which said cylindrical member is rigidly secured to said second hinge member, said lever when being moved from its releasing position toward its locking position passing beyond its dead-center position.

17. A hinge fitting as defined in claim 15, further comprising a yoke-like member embracing said two free sections of said belt-like member and engaging upon the lateral outer sides thereof between said secured ends of said sections and said cylindrical member and normally bending each of said sections at an angle toward the other section.

18. A hinge fitting as defined in claim 15, further comprising a yoke-like member embracing said free sections of said belt-like member and engaging upon the lateral outer sides thereof between said secured ends of said sections and said cylindrical member and normally bending each of said sections at an angle toward the other section, and means for adjusting the effective length of said yoke-like member so as to permit the distance between said angularly bent sections to be varied.

References Cited

UNITED STATES PATENTS

| | | | |
|---|---|---|---|
| 1,203,426 | 10/1916 | Springer | 188—77 |
| 1,932,299 | 10/1933 | Wippermann | 188—77 |
| 2,295,224 | 9/1942 | Le Tourneau | 188—77 |
| 3,156,004 | 11/1964 | Strien et al. | 297—373 |

FOREIGN PATENTS 397,102  11/1931  Great Britain.

BOBBY R. GAY, Primary Examiner

D. L. TROUTMAN, Assistant Examiner

U.S. Cl. X.R.

16—146; 188—77